United States Patent
Rokutanda et al.

(10) Patent No.: US 6,882,749 B2
(45) Date of Patent: Apr. 19, 2005

(54) IMAGE DATA PROCESSING METHOD AND ELECTRONIC CAMERA USING THE IMAGE DATA PROCESSING METHOD

(75) Inventors: Etsuko Rokutanda, Hachioji (JP); Keita Kimizuka, Hachioji (JP)

(73) Assignee: Konica Corporation, Tokyo (JP)

( * ) Notice: Subject to any disclaimer, the term of this patent is extended or adjusted under 35 U.S.C. 154(b) by 744 days.

(21) Appl. No.: 09/962,473

(22) Filed: Sep. 25, 2001

(65) Prior Publication Data

US 2002/0039140 A1 Apr. 4, 2002

(30) Foreign Application Priority Data

Sep. 29, 2000 (JP) ........................... 2000-298544

(51) Int. Cl.$^7$ .............................. G06K 9/36; G06K 9/46
(52) U.S. Cl. ........................................ 382/232; 382/251
(58) Field of Search ................................ 382/218, 226, 382/228, 232, 235, 239, 251, 253, 305; 386/112; 348/220.1, 222.1, 208.12, 231.6, 231.9, 333.02, 333.11, 335; 375/240.03, 240.16, 240.22

(56) References Cited

U.S. PATENT DOCUMENTS

| | | | | |
|---|---|---|---|---|
| 5,526,047 A | * | 6/1996 | Sawanobori | 348/222.1 |
| 5,638,184 A | * | 6/1997 | Fujimoto et al. | 386/112 |
| 6,018,362 A | * | 1/2000 | Suzuki et al. | 348/220.1 |
| 6,249,313 B1 | * | 6/2001 | Nishi | 348/231.9 |
| 6,301,392 B1 | * | 10/2001 | Acharya | 382/239 |
| 6,314,206 B1 | * | 11/2001 | Sato | 382/235 |
| 6,549,307 B1 | * | 4/2003 | Makishima et al. | 348/333.11 |
| 6,563,542 B1 | * | 5/2003 | Hatakenaka et al. | 348/333.02 |
| 6,674,468 B1 | * | 1/2004 | Hosoe et al. | 348/231.6 |
| 6,704,053 B1 | * | 3/2004 | Niikawa et al. | 348/340 |
| 6,798,447 B1 | * | 9/2004 | Katsuki | 348/208.12 |

* cited by examiner

Primary Examiner—Andrew W. Johns
Assistant Examiner—Amir Alavi
(74) Attorney, Agent, or Firm—Cantor Colburn LLP

(57) ABSTRACT

An electronic camera includes: an image sensor for converting an optical image relating to a photographic object into electric signals; a processor for compress-processing image data corresponding to the electric signals at a predetermined compression ratio for each of a plurality of blocks to obtain compressed image data. The processor compares a data amount of the compressed image data with a predetermined amount of data, and compress-processes again the image data at a compression ratio greater than the predetermined compression ratio only when the data amount of the compressed image data exceeds the predetermined amount of data. The electronic camera further includes a recorder for storing the compressed image data compress-processed by the processor in a memory medium.

28 Claims, 4 Drawing Sheets

FIG. 4(a)-1 FIG. 4(a)-2 FIG. 4(a)-3

SCENE (1)     SCENE (2)     SCENE (3)

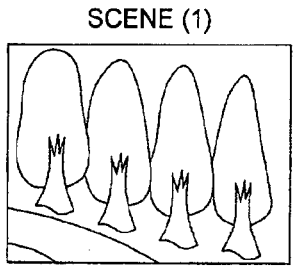 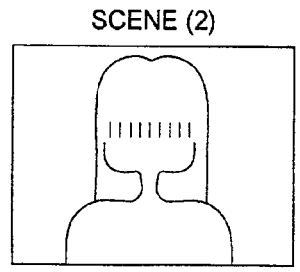 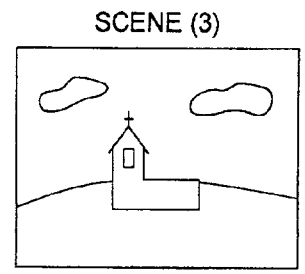

FIG. 4(b)

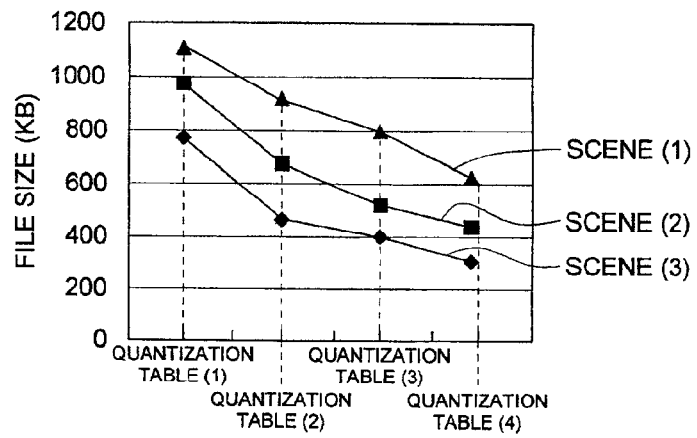

FIG. 4(c)-1

QUANTIZATION TABLE (1)

$$\begin{bmatrix} 2 & 1 & 1 & 2 & 2 & 4 & 5 & 6 \\ 1 & 1 & 1 & 2 & 3 & 6 & 6 & 6 \\ 1 & 1 & 2 & 2 & 4 & 6 & 7 & 6 \\ 1 & 2 & 2 & 3 & 5 & 9 & 8 & 6 \\ 2 & 2 & 4 & 6 & 7 & 11 & 10 & 8 \\ 2 & 4 & 6 & 6 & 8 & 10 & 11 & 9 \\ 5 & 6 & 8 & 9 & 10 & 12 & 12 & 10 \\ 7 & 9 & 10 & 10 & 11 & 10 & 10 & 10 \end{bmatrix}$$

FIG. 4(c)-2

QUANTIZATION TABLE (2)

$$\begin{bmatrix} 3 & 2 & 2 & 3 & 5 & 8 & 10 & 12 \\ 2 & 2 & 3 & 4 & 5 & 12 & 12 & 11 \\ 3 & 3 & 3 & 5 & 8 & 11 & 14 & 11 \\ 3 & 3 & 4 & 6 & 10 & 17 & 16 & 12 \\ 4 & 4 & 7 & 11 & 15 & 22 & 21 & 15 \\ 5 & 7 & 11 & 13 & 16 & 21 & 23 & 18 \\ 10 & 13 & 16 & 17 & 21 & 24 & 24 & 20 \\ 14 & 18 & 19 & 20 & 22 & 20 & 21 & 20 \end{bmatrix}$$

FIG. 4(c)-3

QUANTIZATION TABLE (3)

$$\begin{bmatrix} 5 & 3 & 3 & 5 & 7 & 12 & 15 & 18 \\ 4 & 4 & 4 & 6 & 8 & 17 & 18 & 17 \\ 4 & 4 & 5 & 7 & 12 & 17 & 21 & 17 \\ 4 & 5 & 7 & 9 & 15 & 26 & 24 & 19 \\ 5 & 7 & 11 & 17 & 20 & 33 & 31 & 23 \\ 7 & 11 & 17 & 19 & 24 & 31 & 34 & 28 \\ 15 & 19 & 23 & 26 & 31 & 36 & 36 & 30 \\ 22 & 28 & 29 & 29 & 34 & 30 & 31 & 30 \end{bmatrix}$$

FIG. 4(c)-4

QUANTIZATION TABLE (4)

$$\begin{bmatrix} 6 & 4 & 4 & 6 & 10 & 16 & 20 & 24 \\ 5 & 5 & 6 & 8 & 10 & 23 & 24 & 22 \\ 6 & 5 & 6 & 10 & 16 & 23 & 28 & 22 \\ 6 & 7 & 9 & 12 & 20 & 35 & 32 & 25 \\ 7 & 9 & 15 & 22 & 27 & 44 & 41 & 31 \\ 10 & 14 & 22 & 26 & 32 & 42 & 45 & 37 \\ 20 & 26 & 31 & 35 & 41 & 48 & 48 & 40 \\ 29 & 37 & 38 & 39 & 45 & 40 & 41 & 41 \end{bmatrix}$$

FIG. 5 (a)

$$\begin{bmatrix} 2 & 1 & 1 & 2 & 2 & 4 & 5 & 7 \\ 1 & 1 & 1 & 2 & 2 & 6 & 6 & 6 \\ 1 & 1 & 2 & 2 & 4 & 6 & 7 & 6 \\ 1 & 2 & 2 & 3 & 5 & 9 & 9 & 7 \\ 2 & 2 & 4 & 6 & 7 & 11 & 11 & 8 \\ 2 & 3 & 6 & 7 & 9 & 11 & 12 & 9 \\ 5 & 7 & 8 & 9 & 11 & 13 & 13 & 11 \\ 7 & 9 & 10 & 10 & 12 & 11 & 11 & \boxed{10} \end{bmatrix}$$

$$\begin{bmatrix} 5 & 2 & 2 & 5 & 5 & 11 & 14 & 20 \\ 2 & 2 & 2 & 5 & 5 & 17 & 17 & 17 \\ 2 & 2 & 5 & 5 & 11 & 17 & 20 & 17 \\ 2 & 5 & 5 & 8 & 14 & 25 & 25 & 20 \\ 5 & 5 & 11 & 17 & 20 & 31 & 31 & 23 \\ 5 & 8 & 17 & 20 & 25 & 31 & 34 & 25 \\ 14 & 20 & 23 & 25 & 31 & 37 & 37 & 31 \\ 20 & 25 & 28 & 28 & 34 & 31 & 31 & \boxed{28} \end{bmatrix}$$

IMAGE DATA PROCESSING METHOD AND ELECTRONIC CAMERA USING THE IMAGE DATA PROCESSING METHOD

BACKGROUND OF THE INVENTION

This invention relates to an image processing technology, and in particular, to an image processing technology for use in an electronic camera.

Accompanied by the improvement of the electronic technology, an electronic camera which converts an image sensed into digital data to memorize them has been developed and already on the market. A user can display an image that has been sensed by an electronic camera on the display of his own personal computer for example, and further, can print the image through a printer; therefore, its range of application has become broad.

Incidentally, an image which has been sensed by an electronic camera is converted into image data, which are stored in a memory as compressed. In this case, the image data volume after compression processing (what is called the file size) usually varies in accordance with the photographic object sensed. That is, a low frequency image such as the sky is compressed with its file size made comparatively small, and a high frequency image such as a woods is compressed with its file size made comparatively large. Such compression processing is called compression processing of variable length.

Owing to such a characteristic of compression as mentioned above, assuming that the memory capacity of the memory medium of an electronic camera is constant, there is a problem that it cannot be known until image sensing has been completed how many image frames can be stored in such a memory medium; this is different from a camera for a silver halide film.

For such kind of a problem, compression processing of fixed length has been developed. According to such compression processing of fixed length, for example, in the case where the file size is fixed at 100 KB, because all images are stored as compressed to 100 KB, 80 image frames can be stored in the case where a memory medium of 8 MB is used; therefore, a user of an electronic camera can immediately understand how many image frames are left to be sensed, which is convenient to him.

However, in the compression processing of fixed length, there is a problem that it needs pre-processing in which the frequency component of the image is analyzed beforehand so as to determine the ratio of compression, which makes the processing time increase. For such a problem, it has been also considered that a high ratio of compression is set beforehand in order that an image of any kind may be made always to have a file size of 100 KB or under. However, if the ratio of compression is set at a high value, image quality becomes low in proportion to it; therefore, the actual situation is that compression processing of an excessively high compression ratio should be avoided.

SUMMARY OF THE INVENTION

This invention has been made in view of the above-mentioned problems in the conventional technology, and it is an object of the invention to provide an image data processing method and an electronic camera which is capable of securing the number of image frames of the image data to be stored in the memory medium while suppressing the processing time for image data.

In order to accomplish the above-mentioned object, the invention has any one of the following structures:

1. An electronic camera comprising: an image sensor for converting an optical image of a photographic object into an electrical signal to be obtained; a processor for applying compression processing to the image data corresponding to the electrical signal at a specified compression ratio for each of a plurality of blocks to obtain compressed image data, wherein the processor compares the data volume of the compressed image data with a specified data volume, and only when the data volume of the compressed image data exceeds the specified data volume, the processor applies compression processing again to the image data at a compression ratio higher than the specified compression ratio; and a recording means for storing the compressed image data which have been compression-processed by the processor in a memory medium.

2. An image data processing apparatus comprising: input means for inputting image data; and a processor for applying compression processing to the image data for each of a plurality of blocks at a specified compression ratio to obtain compressed image data, wherein the processor compares the data volume of the compressed image data with a specified data volume, and only when the data volume of the compressed image data exceeds the specified data volume, the processor applies compression processing again to the image data at a compression ratio higher than the specified compression ratio.

3. A method of processing image data comprising the steps of: inputting image data; and applying compression processing to the image data for each of a plurality of blocks at a specified compression ratio to obtain compressed image data, wherein the step of obtaining compressed image data comprises comparing the data volume of the compressed image data with a specified data volume, and only when the data volume of the compressed image data exceeds the specified data volume, practicing compression processing again the image data at a compression ratio higher than the specified compression ratio.

Further, it is preferable that the method of processing image data of this invention comprises the steps of sensing an image of a photographic object, converting it into image data corresponding to it, carrying out compression processing of said image data at a specified compression ratio for each of a plurality of blocks, comparing the data volume of the image data that have been compression-processed with a specified data volume, and if it exceeds the specified data volume, carrying out compression processing of said image data again at a compression ratio higher than said specified compression ratio.

The examples of preferable structures are as follows.

(1) A method of processing image data characterized in that an image of a photographic object is sensed, and is converted into corresponding image data, which are compression-processed at a specified compression ratio for each of a plurality of blocks, and the data volume of the image data which have been compression-processed is compared with a specified data volume, and only when the former exceeds the latter, the image data are again compression-processed at a compression ratio higher than the specified compression ratio.

(2) The method of processing image data set forth in the structure (1) characterized in that the alteration of the quantization table is carried out when the image data are again compression-processed.

(3) The method of processing image data set forth in the structure (1) or (2) characterized in that the data volume of the image data which have been again compression-processed is changed on the basis of at least one of the number of blocks which have been compression-processed and the coefficient.

(4) The method of processing image data set forth in the structure (1) characterized in that the data volume of the image data which have been again compression-processed is changed on the basis of at least one of the proportion of the number of blocks which have been compression-processed to the number of total blocks and the coefficient.

(5) The method of processing image data set forth in the structure (3) or (4) characterized in that the coefficient is changed on the basis of the data volume of the image data.

(6) The method of processing image data set forth in any one of the structures (3) to (5) characterized in that the coefficient is changed on the basis of the specified data volume.

(7) The method of processing image data set forth in any one of the structures (3) to (6) characterized in that the coefficient is changed in accordance with the number of times of the change.

(8) An electronic camera practicing the method of processing image data set forth in any one of structures (1) to (7) characterized in that the compression-processed image data are stored in a memory medium.

(9) An electronic camera as set forth in the structure (8) characterized in that the specified data volume is changed in accordance with the remaining memory capacity of the memory medium.

According to the method of processing image data of the invention, when data volume of the image data after being compressed at the specified compression ratio, is small, the image data are stored as they are, which secures the rapidity of the processing and the image quality, and on the other hand, only when the image data have a large data volume after being compressed at the specified compression ratio, the image data are compressed again, which makes it possible to store more image data even when the storing capacity of a memory medium is limited.

Further, it is preferable that the alteration of the quantization table is carried out when the image data are compressed again.

Further, it is preferable that the data volume of the aforesaid image data which have been compression-processed again is altered on the basis of at least one of the number of the blocks that have been compression-processed and the coefficient.

Further, it is preferable that the data volume of the aforesaid image data which have been compression-processed again is changed on the basis of at least one of the proportion of the number of the blocks that have been compression-processed to the number of all blocks and the coefficient, because the processing can be carried out rapidly.

Further, it is preferable that the aforesaid coefficient is changed on the basis of the data volume of the aforesaid image data.

Further, it is preferable that the aforesaid coefficient is changed on the basis of the aforesaid specified data volume.

Further, it is preferable that the aforesaid coefficient is changed in accordance with the number of times of the change.

Further, in an electronic camera, it is preferable that the aforesaid method of image data processing is practiced, and the aforesaid image data which have been subjected to compression processing are stored in a memory medium. The reason of this is that, in an electronic camera, a memory medium having a limited capacity is used in most cases.

In this case, it is preferable that the aforesaid specified data volume is changed in accordance with the remaining memory capacity of the aforesaid memory medium, because a user can be informed of, for example, how many frames more can be sensed.

BRIEF DESCRIPTION OF THE DRAWINGS

FIG. 4($a$)-1 to FIG. 4($c$)-4 are drawings showing examples of the relation between quantization tables and file sizes; and FIG. 5($a$) and FIG. 5($b$) are drawings showing a quantization table before alteration (FIG. 4($a$)) and a quantization table after alteration (FIG. 4($b$)) in comparison.

DETAILED DESCRIPTION OF THE PREFERRED EMBODIMENT

Figure 1:
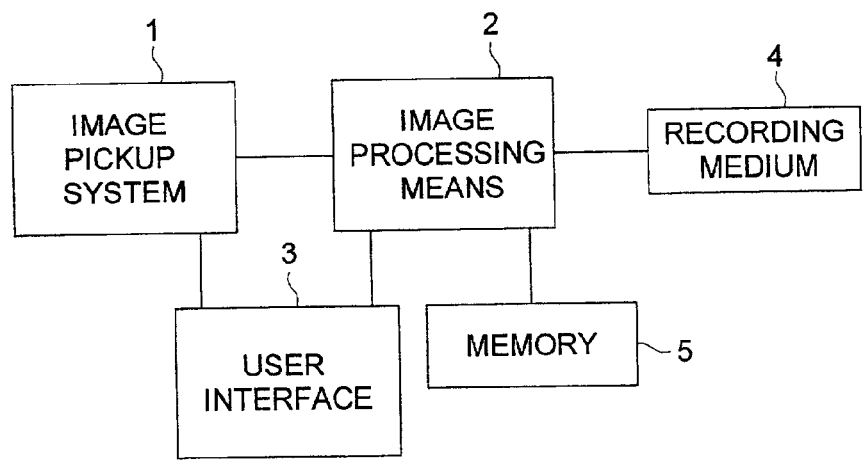
FIG. 1 is a block diagram showing the structure of an electronic camera according to this embodiment of the invention.

In the following, an embodiment of this invention will be explained by referring to the drawings.

FIG. 1 is a block diagram showing the structure of an electronic camera according to this embodiment of the invention. In FIG. 1, the image sensing system 1 including a photographing lens and an image sensing device such as a CCD sensor converts an image of a photographic object into image data and outputs them, on the basis of a drive signal from the user interface 3 including a release switch etc. The outputted image data are once stored in the memory 5 temporarily, and then, after they are subjected to compression processing and gradation correction in the image processing means 2, they are supposed to be stored as stored in the memory medium 4 such as a memory card. In addition, in this embodiment, the image processing means 2 is also used as the recording means for performing the data recording in the memory medium 4.

Figure 2:
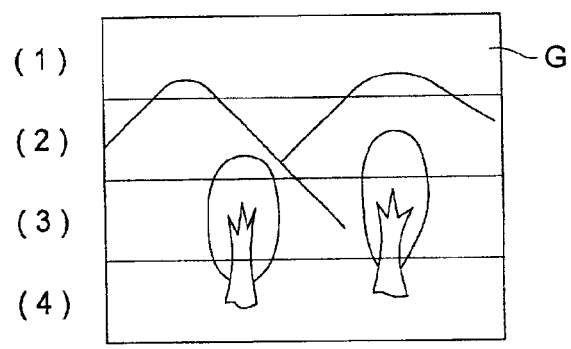
FIG. 2 is a drawing showing an example of an image photographed by an electronic camera.
Figure 3:
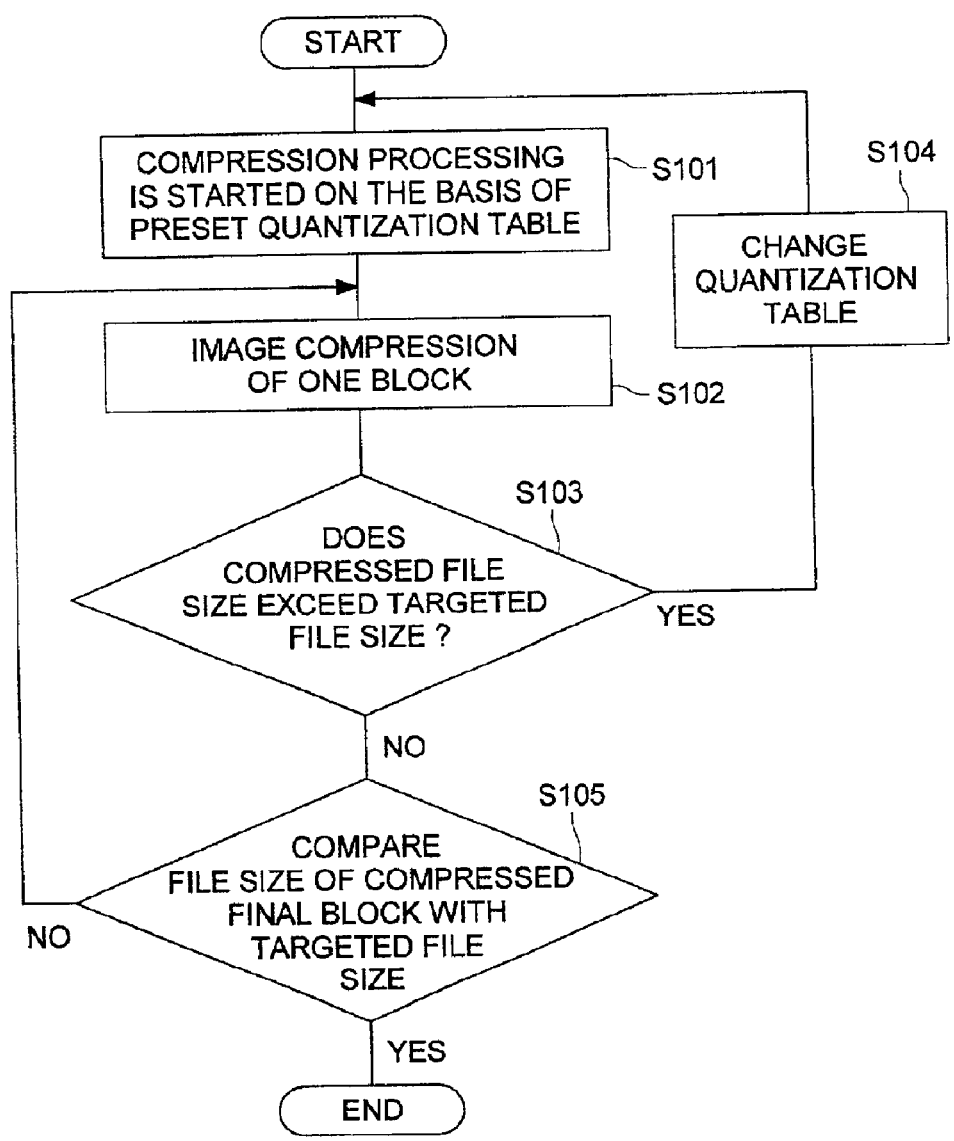
FIG. 3 is a flow chart showing the operation practiced in the image processing means 2.

Next, the method of image data processing in an electronic camera of this embodiment will be explained. FIG. 2 is a drawing showing an example of an image photographed by an electronic camera, and FIG. 3 is a flow chart showing the operation practiced in the image processing means 2.

First, it is assumed that image data are obtained by the image sensing system 1 and stored in the memory 5. Such image data are divided into a plurality of blocks by the image processing means 2 for the convenience of processing in it. In the step S101 in FIG. 3, the image processing means 2 starts compression processing on the basis of the preset quantization table. Because the image data are arranged in lines from the upper left portion of the image G in FIG. 2 toward the right direction in such a manner as to connect the lines to one another, compression processing is carried out in this order.

After the compression processing for the first block (1) is finished (step S102), the image processing means 2 judges, in the step S103, whether the file size of the block (1) which has been just compression-processed exceeds the specified file size or not. In the above statement, the specified file size means a target file size in the case where all the blocks of the image G, for example, are subjected to compression processing.

If the image processing means 2 judges that the file size of the compression-processed block (1) does not exceeds the specified file size, it continues to carry out compression processing on and after the succeeding block (2). On the other hand, if it judges that the file size of the block (1) exceeds the specified file size, it alters the quantization table to make the ratio of compression higher (step S104).

FIG. 4(a)-1 to FIG. 4(c)-4 are drawings showing the examples of the relation between quantization tables and file sizes.

The scene (1) shown in FIG. 4(a) is a high frequency image, the scene (3) is a low frequency image, and the scene (2) is an image having a frequency intermediate between the scene (1) and scene (3). The results presenting the file sizes after compression processing when compression processing using the quantization tables (1) to (4) shown in FIG. 4(c)-1 to FIG. 4(c)-4 respectively is applied to the image data obtained by photographing these images are shown in FIG. 4(b). The quantization tables shown in FIG. 4(c)-1 to FIG. 4(c)-4 give compression ratio which are made larger in the order from (1) to (4). Moreover, as clearly understood from FIG. 4(b), the file size after compression processing becomes smaller the higher compression ratio is raised, and the file size after compression processing becomes larger the higher the frequency of the image data becomes.

FIG. 5(a) and FIG. 5(b) are drawings showing the quantization table before alteration and the quantization table after alteration in comparison. The quantization table to be set after n-th alteration is determined on the basis of the following expression:

$$n\text{-th quantization table}=(\text{quantization table determined by the } (n-1)\text{th alteration})\times \alpha n,$$

where $\alpha n$ denotes an arbitrary coefficient. Further, it is preferable that the n-th quantization table is expressed by the following equation by substituting ((number of total blocks)/(number of processed blocks))×(n-th coefficient) for $\alpha n$:

$$n\text{-th quantization table}=(\text{quantization table determined by } (n-1)\text{th alteration})\times((\text{number of total blocks})/(\text{number of processed blocks}))\times(n\text{-th coefficient}).$$

In the above expression, when n=1, the "quantization table determined by (n−1)th alteration" means the specified quantization table that has been stored.

Further, the "number of total blocks" means the total number of divisional blocks when the image data are divided into blocks, and the "number of processed blocks" means the cumulative number of blocks to which compression processing has been applied by using the quantization table before the alteration of the quantization table.

To take the value of the last element in the quantization table, in the example shown in FIG. 5(a) and FIG. 5(b), for example, in the case where the number of total blocks is 7500 and the number of processed blocks is 5200, after n-th coefficient is made 2, the values are substituted for the terms in the right-hand side of the above expression; then, 10 (the last element value in the quantization table before alteration)×7500/5200×2=28 (the last element value in the quantization table after alteration) can be obtained.

It is preferable that the n-th coefficient is a value that increases in accordance with the number of times of alteration of the quantization table. If this is made to be constant, in the case where the file size of image data after compression processing is considerably large, it becomes necessary to alter the quantization table several times until the file size becomes the specified file size or under, and a long time is estimated for the procedure. Therefore, it is judged that the file size becomes larger the more the number of times of alteration becomes, and unnecessary compression processing can be avoided by making the n-th coefficient variable to increase in accordance with the number of times of alteration (for example, to make it power of n).

Further, for the technique of determining the n-th coefficient, it can be also considered to make it a value that is proportional to the difference between the file size of the block before compression processing and the specified file size.

As explained in the foregoing, the operation such that the sum of the file sizes of the blocks which have been compression-processed block by block is successively compared with the specified file size is continued until the last block (step S105); then, if the file size after compression processing does not exceed the specified file size, the image processing means 2 completes compression processing, and the image data that have been compression-processed are stored in the memory medium 4.

The method of image data processing of this embodiment is practically effective in a use to be described in the following. That is, the maximum file sizes in the respective image quality modes of an electronic camera are made to be 800 KB (superfine mode), 400 KB (fine mode), and 100 KB (normal mode), and only image data that exceeds the above size concerned are to be subjected to compression processing. By doing this way, it is understood that, in the case where image data are stored in a memory medium of 8 MB, 10 image frames and more (in superfine mode), 20 image frames and more (in fine mode), and 80 image frames and more (in normal mode) can be sensed without fail.

Further, when the remaining capacity of the memory medium becomes small, 700 KB for example, in the case where image sensing is done in the superfine mode, by changing the specified file size to 700 KB, the remaining number of frames for photographing can be exactly displayed as one frame for example. In this case, it can also be considered to change the above-mentioned n-th coefficient. On the other hand, in the case where image sensing is done in the fine mode, by making the image data of the first frame 400 KB or under and the image data of the second frame 300 KB, the remaining number of frames to be photographed can be exactly displayed as two frames, and this can be actualized; therefore, an electronic camera that is more friendly to users can be provided.

According to the method of processing image data of this embodiment, a pre-processing which has been necessary for a conventional compression processing of fixed length is not required, it is also unnecessary to take the trouble to make image data having small file size large, and it is possible to secure the number of image frames to be stored in a memory medium of constant memory capacity by applying compression processing to image data having a large file size only.

Up to now, this invention has been explained by referring to an embodiment, but this invention should not be construed as limited to the above-mentioned embodiment, and it is a matter of course that the invention can be suitably altered and improved.

According to this invention, it is possible to provide an image data processing method and an electronic camera which is capable of securing the number of image frames of the image data to be stored in the memory medium while suppressing the processing time for image data.

What is claimed is:

1. An electronic camera comprising:
   (a) an image sensor for converting an optical image relating to a photographic object into electric signals;
   (b) a processor for compress-processing image data corresponding to the electric signals at a predetermined compression ratio for each of a plurality of blocks to obtain compressed image data,
   wherein the processor compares a data amount of the compressed image data with a predetermined amount of data, and compress-processes again the image data at a compression ratio greater than the predetermined compression ratio only when the data amount of the compressed image data exceeds the predetermined amount of data; and
   (c) a recorder for storing the compressed image data compress-processed by the processor in a memory medium.

2. The electronic camera of claim 1, wherein the processor compress-processes the image data using a quantization table, and only when the data amount of the compressed image data exceeds the predetermined amount of data, the processor compress-processes again the image data by altering the compression ratio through changing the quantization table.

3. The electronic camera of claim 1, wherein only when the data amount of the compressed image data exceeds the predetermined amount of data, the processor compress-processes again the image data by altering the compression ratio on the basis of at least one of a number of blocks which have been compress-processed and a coefficient.

4. The electronic camera of claim 3, wherein only when the data amount of the compressed image data exceeds the predetermined amount of data, the processor compress-processes again the image data using a quantization table representing the following expression:

$$n\text{-th quantization table}=(\text{quantization table determined by the }(n-1)\text{th alteration})\times \alpha n,$$

where $\alpha n$ denotes an arbitrary coefficient.

5. The electronic camera of claim 3, wherein only when the data amount of the compressed image data exceeds the predetermined amount of data, the processor alters the compression ratio by changing the coefficient on the basis of the data amount of the image data, and compress-processes again the image data.

6. The electronic camera of claim 3, wherein only when the data amount of the compressed image data exceeds the predetermined amount of data, the processor alters the compression ratio by changing the coefficient on the basis of the predetermined amount of data, and compress-processes again the image data.

7. The electronic camera of claim 3, wherein only when the data amount of the compressed image data exceeds the predetermined amount of data, the processor alters the compression ratio by changing the coefficient in accordance with a number of changing of the coefficient, and compress-processes again the image data.

8. The electronic camera of claim 1, wherein only when the data amount of the compressed image data exceeds the predetermined amount of data, the processor alters the compression ratio by changing the coefficient on the basis of at least a ratio of a number of processed blocks to a number of entire blocks and a coefficient, and compress-processes again the image data.

9. The electronic camera of claim 8, wherein only when the data amount of the compressed image data exceeds the predetermined amount of data, the processor compress-processes again the image data using a quantization table representing the following expression:

$$n\text{-th quantization table}=(\text{quantization table determined by }(n-1)\text{th alteration})\times((\text{number of total blocks})/(\text{number of processed blocks}))\times(n\text{-th coefficient}),$$

where $\alpha n$ denotes an arbitrary coefficient.

10. The electronic camera of claim 8, wherein only when the data amount of the compressed image data exceeds the predetermined amount of data, the processor alters the compression ratio by changing the coefficient on the basis of the data amount of the image data, and compress-processes again the image data.

11. The electronic camera of claim 8, wherein only when the data amount of the compressed image data exceeds the predetermined amount of data, the processor alters the compression ratio by changing the coefficient on the basis of the predetermined amount of data, and compress-processes again the image data.

12. The electronic camera of claim 8, wherein only when the data amount of the compressed image data exceeds the predetermined amount of data, the processor alters the compression ratio by changing the coefficient in accordance with a number of changing of the coefficient, and compress-processes again the image data.

13. The electronic camera of claim 1, wherein the predetermined amount of data can be altered according to a remaining memory capacity of the memory medium.

14. An image data processing apparatus comprising:
   (a) an input device for inputting image data; and
   (b) a processor for compress-processing the image data for each of a plurality of blocks at a predetermined compression ratio to obtain compressed image data,
   wherein the processor compares a data amount of the compressed image data with a predetermined amount of data, and compress-processes again the image data at a compressing ratio greater than the predetermined compression ratio only when the data amount of the compressed image data exceeds the predetermined amount of data.

15. An image data processing method comprising the steps of:
   (a) inputting image data; and
   (b) compress-processing the image data for each of a plurality of blocks at a predetermined compression ratio, thereby obtaining compressed image data,
   wherein the step of the compress-processing the image data compares an amount of data of the compressed image data with a predetermined amount of data, and compress-processes again the image data at a compressing ratio greater than the predetermined compression ratio only when the data amount of the compressed image data exceeds the predetermined amount of data.

16. The image data processing method of claim 15, wherein the step of inputting comprises the step of converting an optical image relating to a photographic object into electric signals, thereby obtaining converted electric signals, and obtaining image data in accordance with the converted electric signals.

17. The image data processing method of claim 16, wherein only when the data amount of the compressed image data exceeds the predetermined amount of data, the step of obtaining compressed image data comprises the step of compress-processing the image data using a quantization table, and compress-processing again the image data by altering the compression ratio through changing the quantization table.

18. The image data processing method of claim 16, wherein only when the data amount of the compressed image data exceeds the predetermined amount of data, the step of obtaining compressed image data comprises the step of compress-processing again the image data by altering the compression ratio on the basis of at least one of a number of blocks which have been compress-processed and a coefficient.

19. The image data processing method of claim 18, wherein only when the data amount of the compressed image data exceeds the predetermined amount of data, the step of obtaining compressed image data comprises the step of compress-processing again the image data using a quantization table representing the following expression:

$$n\text{-th quantization table} = (\text{quantization table determined by the } (n-1)\text{th alteration}) \times \alpha n,$$

where $\alpha n$ denotes an arbitrary coefficient.

20. The image data processing method of claim 18, wherein only when the data amount of the compressed image data exceeds the predetermined amount of data, the step of obtaining compressed image data comprises the step of altering the compression ratio by changing the coefficient on the basis of the data amount of the image data, and compress-processing again the image data.

21. The image data processing method of claim 18, wherein only when the data amount of the compressed image data exceeds the predetermined amount of data, the step of obtaining compressed image data comprises the step of altering the compression ratio by changing the coefficient on the basis of the predetermined amount of data, and compress-processing again the image data.

22. The image data processing method of claim 18, wherein only when the data amount of the compressed image data exceeds the predetermined amount of data, the step of obtaining compressed image data comprises the step of altering the compression ratio by changing the coefficient in accordance with a number of changing of the coefficient, and compress-processing again the image data.

23. The image data processing method of claim 16, wherein only when the data amount of the compressed image data exceeds the predetermined amount of data, the step of obtaining compressed image data comprises the step of altering the compression ratio by changing the coefficient on the basis of at least a ratio of a number of processed blocks to a number of entire blocks and a coefficient, and compress-processing again the image data.

24. The image data processing method of claim 23, wherein only when the data amount of the compressed image data exceeds the predetermined amount of data, the step of obtaining compressed image data comprises the step of compress-processing again the image data using a quantization table representing the following expression:

$$n\text{-th quantization table} = (\text{quantization table determined by } (n-1)\text{th alteration}) \times ((\text{number of total blocks})/(\text{number of processed blocks})) \times (n\text{-th coefficient}),$$

where $\alpha n$ denotes an arbitrary coefficient.

25. The image data processing method of claim 23, wherein only when the data amount of the compressed image data exceeds the predetermined amount of data, the step of obtaining compressed image data comprises the step of altering the compression ratio by changing the coefficient on the basis of the data amount of the image data, and compress-processing again the image data.

26. The image data processing method of claim 23, wherein only when the data amount of the compressed image data exceeds the predetermined amount of data, the step of obtaining compressed image data comprises the step of altering the compression ratio by changing the coefficient on the basis of the predetermined amount of data, and compress-processing again the image data.

27. The image data processing method of claim 23, wherein only when the data amount of the compressed image data exceeds the predetermined amount of data, the step of obtaining compressed image data comprises the step of altering the compression ratio by changing the coefficient in accordance with a number of changing of the coefficient, and compress-processing again the image data.

28. The image data processing method of claim 16, wherein the predetermined amount of data can be altered according to a remaining memory capacity of the memory medium.

* * * * *